United States Patent
Powers et al.

(10) Patent No.: US 7,616,149 B2
(45) Date of Patent: Nov. 10, 2009

(54) METHODS AND APPARATUS FOR RADAR TIME SENSOR

(75) Inventors: Stanley J. Powers, Chelmsford, MA (US); Russell H. Aten, Berlin, MA (US); Anthony J. Jagodnik, Jr., Bolton, MA (US); Brian J. Danley, Framingham, MA (US); Simon J. Hennin, Worcester, MA (US); Robert J. Stamm, Westborough, MA (US); Timothy I. Harding, Westborough, MA (US)

(73) Assignee: Raytheon Company, Waltham, MA (US)

( * ) Notice: Subject to any disclaimer, the term of this patent is extended or adjusted under 35 U.S.C. 154(b) by 44 days.

(21) Appl. No.: 11/536,198

(22) Filed: Sep. 28, 2006

(65) Prior Publication Data

US 2007/0159378 A1    Jul. 12, 2007

Related U.S. Application Data

(60) Provisional application No. 60/721,510, filed on Sep. 28, 2005.

(51) Int. Cl.
 *G01S 13/00* (2006.01)
(52) U.S. Cl. .......................................... 342/36; 342/37
(58) Field of Classification Search ............. 342/29–51, 342/59, 118, 133, 357.06, 357.09, 385, 386; 701/117, 120, 121, 122, 213, 300, 301
See application file for complete search history.

(56) References Cited

U.S. PATENT DOCUMENTS

| | | | |
|---|---|---|---|
| 3,895,365 A * | 7/1975 | Freed ..................... | 340/870.34 |
| 3,911,439 A * | 10/1975 | Sullivan et al. ............. | 342/428 |
| 4,688,046 A | 8/1987 | Schwab | |
| 5,073,779 A | 12/1991 | Skogmo et al. | |
| 5,334,982 A * | 8/1994 | Owen ......................... | 342/36 |
| 5,374,932 A | 12/1994 | Wyschogrod et al. | |
| 5,506,587 A * | 4/1996 | Lans ..................... | 342/357.09 |
| 6,094,169 A | 7/2000 | Smith et al. | |
| 6,147,646 A * | 11/2000 | Arneson et al. ............. | 342/417 |
| 6,690,296 B2 * | 2/2004 | Corwin et al. .............. | 340/961 |
| 7,170,441 B2 * | 1/2007 | Perl et al. ..................... | 342/29 |
| 2003/0200024 A1 * | 10/2003 | Poreda ....................... | 701/120 |
| 2004/0225432 A1 * | 11/2004 | Pilley et al. ................. | 701/117 |

FOREIGN PATENT DOCUMENTS

WO    WO 2005/085898 A1    9/2005

OTHER PUBLICATIONS

Innovative radar multistatic techniques for air traffic control Evers, C.; Smith, A.; Digital Avionics Systems Conferences, 2000. Proceedings. DASC. The 19th vol. 2, Oct. 7-13, 2000 pp. 7B2/1-7B2/7 vol. 2.*

(Continued)

*Primary Examiner*—Thomas H Tarcza
*Assistant Examiner*—Peter M Bythrow
(74) *Attorney, Agent, or Firm*—Daly, Crowley, Mofford & Durkee, LLP

(57) ABSTRACT

Methods and apparatus to detect and measure energy transmission or azimuth angle information from a radar system at one or more known or measured azimuth angles, determine, for each azimuth angle, the time corresponding to the center of the beam of the energy transmission, receive universal time information, tag the time measurement for each azimuth angle with the universal time information to provide a report, transmit the report to a radar automation system, and determine the radar measurement time for each target report at any azimuth angle from that radar.

31 Claims, 7 Drawing Sheets

OTHER PUBLICATIONS

PCT/US2006/038421 International Search Report dated Jun. 10, 2008 (PCT Article 18 and Rules 43 and 44).
Eurocontrol: "Eurocontrol Standard document for Surveillance data exchange part 4 transmission of Monoradar Target Reports" Internet Citation, [Online] 2000, XP002440836. Retrieved from the Internet: URL:http://www.eurocontrol.int/asterix/gallery/content/public/documents/p4ed114.pdf> [retrieved on Jul. 4, 2007] p. 9.

* cited by examiner

METHODS AND APPARATUS FOR RADAR TIME SENSOR

CROSS REFERENCE TO RELATED APPLICATIONS

The present application claims the benefit of U.S. Provisional Patent Application No. 60/721,510, filed Sep. 28, 2005, which is incorporated herein by reference.

STATEMENT REGARDING FEDERALLY SPONSORED RESEARCH

The Government may have certain rights in the invention pursuant to contract no. DTFA01-96-D-03008.

BACKGROUND

As is known in the art, surveillance radars within the United States National Airspace System (NAS) detect the location of aircraft targets and report that information to En Route and Terminal Automation systems for aircraft tracking and subsequent display to air traffic controllers. Radar target report messages include the range and azimuth of the aircraft target relative to the location of the radar. Beacon radars provide additional information including aircraft-reported altitude and aircraft-reported transponder code. However, the absolute time of radar measurement is not included in the radar target reports transmitted by existing NAS radars to the automation systems. The lack of radar measurement time information with the target report messages introduces errors in the estimate of actual aircraft location being tracked by automation systems for the benefit of the air traffic controller. While some conventional automation systems estimate the radar time of measurement using known techniques, significant errors remain in the estimation of aircraft position. Aircraft separation must be large enough to account for this estimation error.

The existing NAS includes many radar types, including ARSR-3, ARSR-4, ASR-8, ASR-9, ASR-11, GPN-66, etc. Modifying each of these radar types to include the time of radar measurement would be a difficult, costly and impractical task. For example, each radar type would need to be interfaced to a real time clock source. The radar interface protocol would need to be changed to accommodate the addition of a field to contain the radar time of measurement. The radar internal processing would need to be updated to process the newly-interfaced real time information and to format the radar targets in the revised protocol. In addition to the radar modifications, en route and terminal automation systems and other users would need to be modified to accommodate the revised protocol. Taking into consideration that existing radars typically provide data to a variety of users, the radar would need to support both the existing protocol and the new protocol simultaneously until all users have adopted the new protocol. While protocols that include radar measurement time, for example ASTERIX (All Purpose STructured Eurocontrol Radar Information Exchange) are beginning to be adopted internationally, they have not been used in the NAS for the above-mentioned reasons.

SUMMARY

The present invention provides methods and apparatus for a radar measurement time (RMT) sensor to provide universal time information to an automation system, such as En Route and Terminal Automation systems for aircraft tracking. With this arrangement, target reports can be tagged with a universal time, such as from GPS, to enable the automation systems to determine more-accurate aircraft positions so that, for example, aircraft separation intervals can be reduced without compromising safety for more efficient airport and runway utilization. While exemplary embodiments of the invention are shown and described in conjunction with particular applications, it is understood that the invention is applicable to radar systems in general, in which it is desirable to associate universal time with particular events.

In one aspect of the invention, a method includes detecting and measuring energy transmission as a function of time at one or more known azimuth angles from a radar system, determining, for each azimuth angle, the time corresponding to the center of the beam of the energy transmission (the radar measurement time), receiving universal time information, tagging the measurement for each azimuth angle with the universal time information to provide radar measurement time report(s), transmitting these report(s) to automation systems, and using the radar measurement time report(s), together with the corresponding azimuth angles, to determine the radar measurement times for each target report from that radar.

In one embodiment, the method further includes one more of the following features: the measurement is performed directly without detecting energy transmission via antenna angle information, for example an azimuth change pulse and an azimuth reference pulse determined within the radar; the universal time information is provided by a global positioning system (GPS), WWVB or other radio universal time broadcasts, or IRIG-B source; determining absolute time for a range of known azimuth angles from the radar system via time sampling of the energy transmission and the universal time information based upon an azimuth scan rate, the automation system includes an en route or terminal automation system or other control center using radar information, the detected energy transmission includes search radar illumination, the detected energy transmission includes beacon interrogation, determining a radar beam center for the detected radar energy for tagging with the universal time information, using the report to reduce aircraft separation.

In another aspect of the invention, a radar measurement time sensor is integrated with multilateration sensor systems. A growing number of airports are employing multilateration sensor systems to track ground vehicles, taxiing aircraft, and, increasingly, aircraft on simultaneous parallel approaches. Multilateration, from a geographically-distributed network of ground stations (typically called remote units) that enclose the coverage area, either interrogates the target, using "squitter" reports from conventional mode-A/C, Mode-S transponders or 1090 MHz ADS-B transponders. Some remote units have Receive-Transmit capability, while others are Receive-Only. Sets of time differences among remote units are solved to measure position, which is communicated to the automation system at typical rates of one per-second, providing faster and more accurate position reporting than radar.

In a further aspect of the invention, an RMT sensor is integrated with an ADS-B ground station. A growing number of automation systems employ both radar and Automatic Dependent Surveillance-Broadcast (ADS-B) surveillance sensors, to provide overlapping coverage. Airborne ADS-B Transponders employ differentially-corrected GPS receivers to provide a precise position measurement and other information, which is broadcast nominally every 0.5 seconds to neighboring aircraft and ADS-B ground station(s).

A further aspect of the invention provides radar measurement time sensors as Position Adjustable Radar Range Orientation Transponders (PARROTs). Multilateration and ADS-B ground station integrations with RMT sensors can benefit by adding a transmitter, enabling each RMT sensor to function as a PARROT to monitor and calibrate radars, using the communication link to perform remote monitor and control. This functionality can also be applied to stand-alone RMT embodiments. In one embodiment, RMTs can supplement or replace existing PARROTs. The communication network facilitates remote monitoring and control, for example, Built-in Test (BIT) results including beam shape, sidelobe levels, received power, etc. can be periodically sent to the automation system for processing and display at a monitor and control position. From the automation system, a maintenance operator (or software) would be able to control power, set the delay time, alter the transponder code, create indents, and vary other parameters.

In a further aspect of the invention, a RMT sensor is integrated with ADS-B transponders that may be airborne. Typically, the airborne ADS-B Transponders employ differentially-corrected GPS receivers to provide a precise position measurement and other information, which is broadcast every 0.5 seconds or so to neighboring aircraft and ADS-B ground station(s). Two types of secondary surveillance sensors, beacon radar and ADS-B (using ADS-B transponders with GPS position measurement), provide overlapping coverage and are increasingly used by the same automation system. An ADS-B airborne transponder can host one or more RMT sensors, which would be moving, but with precisely-known positions.

In a further aspect of the invention, a radar measurement time sensor includes a radar detector interface to receive energy from a radar system, a time interface to receive universal time information for association with the received radar energy information, a processing module to associate the universal time information with the radar energy information and generate a report, and a communication interface to transmit the report to a remote system.

In another aspect of the invention, a system includes a radar system, a radar measurement time sensor to receive energy from the radar system from which azimuth information can be determined and to receive universal time information, the radar measurement time sensor including a processing module to provide a report containing azimuth and universal time information, and an automation system to receive the report.

BRIEF DESCRIPTION OF THE DRAWINGS

The exemplary embodiments contained herein will be more fully understood from the following detailed description taken in conjunction with the accompanying drawings, in which.

DETAILED DESCRIPTION

Overall Context and Elements

In general, the present invention provides methods and apparatus to provide a radar measurement time (RMT) sensor that provides radar measurement time reports associated with specific radar systems that are tagged with universal time information to automation systems, such as En Route, Terminal, etc. With the reports from the RMT sensor, the automation systems can establish radar measurement times for all targets from that radar system, enabling it to more accurately identify aircraft locations and thereby reduce aircraft separation intervals, for example, to enable more efficient airport use.

While particular parameters, such as radar frequencies and modulation techniques are included to facilitate comprehension of the invention, it is understood that a wide range of parameters and/or characteristics can be used to meet the needs of a particular application without departing from the present invention.

Before describing the invention embodiments in detail, the below list of acronyms that may be used is provided:

| | |
|---|---|
| ACP | Azimuth Change Pulse |
| ADS-B | Automatic Dependent Surveillance - Broadcast |
| APGU | Azimuth Pulse Generating Unit |
| ARP | Azimuth Reference Pulse |
| ARSR | Air Route Surveillance Radar |
| ASR | Airport Surveillance Radar |
| ASTERIX | All-Purpose Structured Eurocontrol Radar Information Exchange |
| ATC | Air Traffic Control |
| BIT | Built-In Test |
| COTS | Commercial Off-The-Shelf |
| FAA | Federal Aviation Administration |
| FMA | Final Monitor Aid |
| IIR | Infinite Impulse Response |
| IP | Internet Protocol |
| IRIG-B | Inter Range Instrumentation Group |
| GPN | Great Plains Network, military nomenclature for ASR |
| GPS | Global Positioning System |
| HTTP | Hypertext Transfer Protocol |
| IFF | Interrogate Friend or Foe |
| MHz | Megahertz |
| MTI | Moving Target Indicator |
| NAS | National Airspace System |
| PARROT | Position Adjustable Range Reference Orientation Transponder |
| PRM-A | Precision Runway Monitoring - Alternate |
| PSR | Primary Surveillance Radar; also referred to as Search Radar |
| RF | Radio Frequency |
| RMT | Radar Measurement Time |
| RTQC | Real-Time Quality Control |
| SSR | Secondary Surveillance Radar; also referred to as Beacon Radar |
| STARS | Standard Terminal Automation Replacement System |
| TCP | Transmission Control Protocol |
| UDP | User Datagram Protocol |
| UTC | Coordinated Universal Time |

Figure 1:
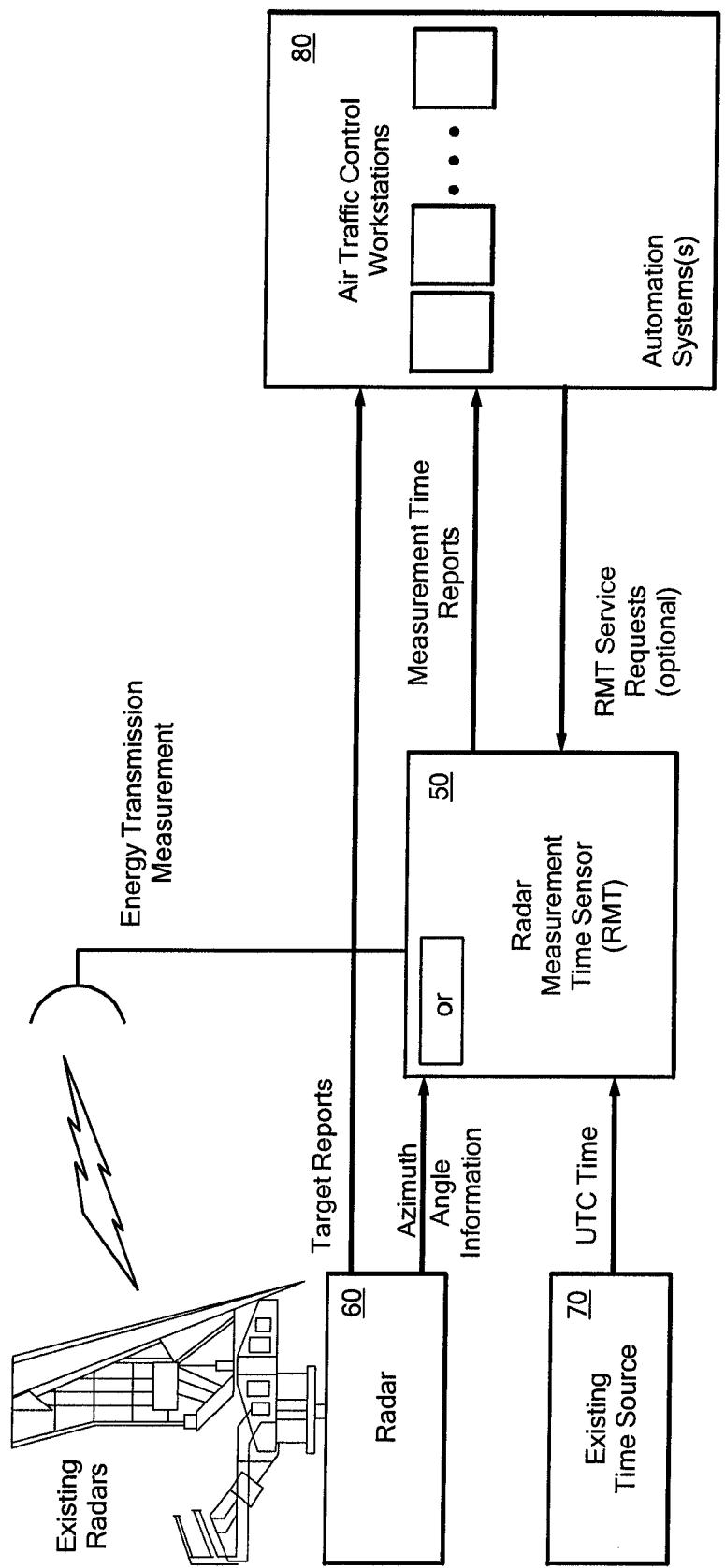
FIG. 1 is a block diagram of a system having a RMT sensor coupled to existing NAS systems in accordance with an exemplary embodiment of the invention.

FIG. 1 shows an illustrative overall context for the processing performed by a Radar Measurement Time (RMT) sensor 50 in accordance with an exemplary embodiment of the invention. Target report data, from one or more radar systems 60 is provided to one or more Air Traffic Control Automation systems 80. One or more RMT sensors 50 are either located with each radar system 60 where they can receive angle information directly, or located far from the radar system 60 at known azimuth angles, possibly on airborne platforms, where they can detect and measure energy from one or more radar systems 60 as the beams sweep by.

Radar measurement times for each known azimuth angle so determined in the RMT sensor 50 are tagged with an accurately-determined (e.g. GPS or other time standard-based) time 70 by the RMT sensor 50, then communicated to the automation systems 80. Each automation system 80 utilizes the received radar measurement times for each known azimuth angle to determine the measurement time for each target report received from that radar system.

Figure 2:
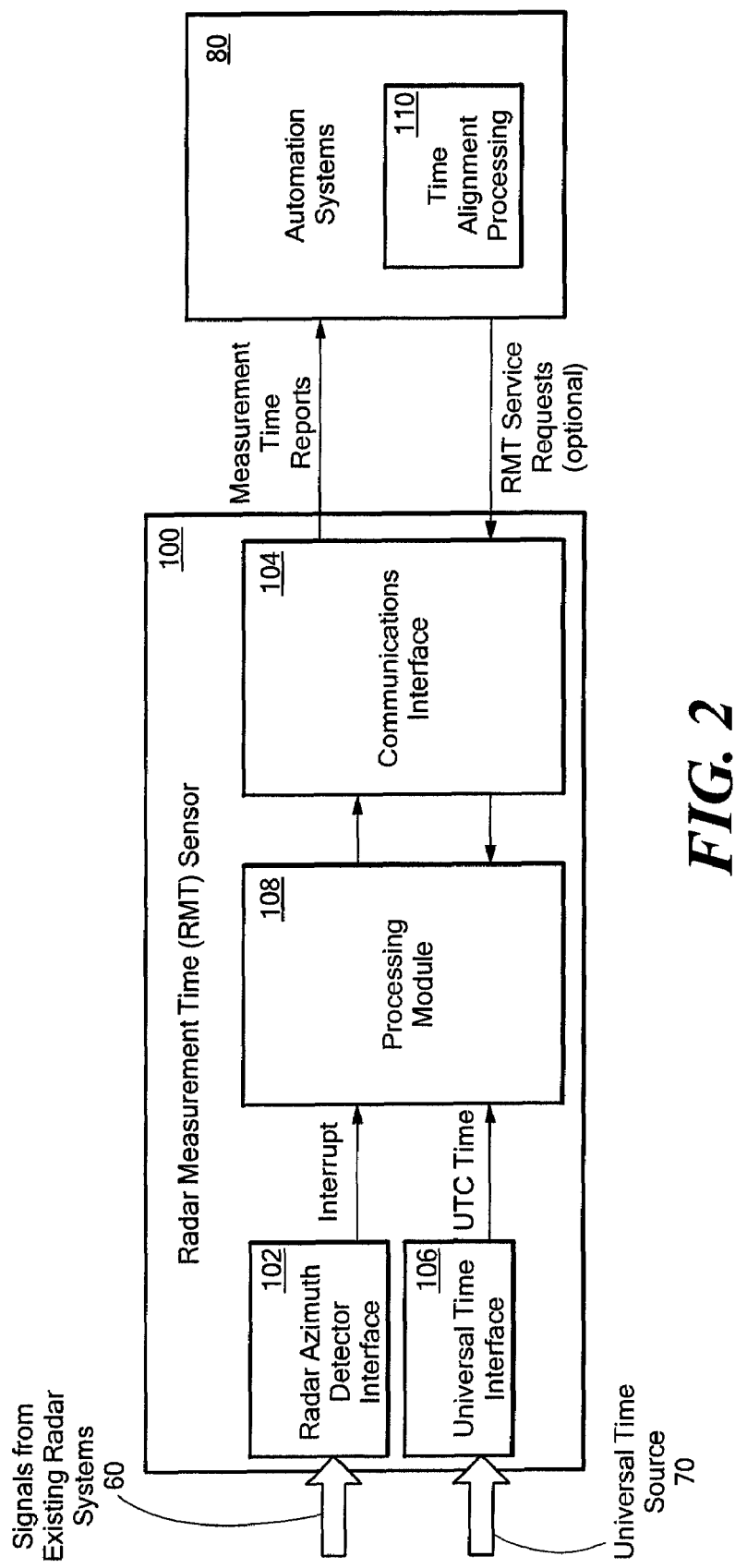
FIG. 2 is a schematic representation of an RMT sensor showing elements of the invention.

FIG. 2 shows elements of the invention, which reside either in the RMT sensor 100 and/or in an automation system 80. These elements include a radar azimuth detector interface 102, a universal time interface 106, a processing module 108, and a communications interface 104 within the RMT sensor 100. In an exemplary embodiment, a time alignment processing module 110 is located in the automation systems 80.

The RMT sensor 100 includes a radar azimuth detector interface 102 to receive signals representing radar azimuth information from radar systems. This information may take the form of antenna azimuth angle information, such as change or reference pulses, in some embodiments, or microwave signals in space as radiated by search or beacon radar antennae in other embodiments. The radar azimuth detector interface 102 may include antennae, receivers, decoder, and/or converter components. For SSR (beacon) embodiments, it may include the radar message decoding scheme shown and described in International Publication No. WO2005/085898, which is incorporated herein by reference, including a dual receiver and antenna, to improve performance in high-interrogation environments where multiple waveforms are likely to be received simultaneously. The output of the radar azimuth detector interface 102 provides digitally-represented timing information about the passage of the radar beam to the processing module 108.

The RMT sensor 100 includes a universal time interface 106, which receives signals conveying the value of absolute real time (UTC—Universal Time Coordinated). In some embodiments, UTC is provided by a collocated GPS receiver. If the RMT sensor 100 includes a GPS real time clock interface, the GPS provided Latitude/Longitude information can be provided in the output message for the benefit of the RMT sensor user. An optional IRIG-B interface can be provided for site locations that already have an UTC clock system available, reducing the configuration cost of the inventive sensor embodiments. Other UTC time sources, including receivers of WWVB 60 kHz radio frequency time signals from NIST Radio Station WWVB, located near Fort Collins, Colo., or other radio broadcast time standards, may also be employed. The illustrated universal time interface 106 includes an antenna 1061 and a time receiver 1062.

The communications interface 104 allows the RMT sensor 100 to communicate with external users such as En Route and Terminal Automation systems. A variety of connection types well known to one of ordinary skill in the art can be used. Exemplary communication types include direct wire connect, dial up connection, and local area network connection. Standard protocols such as IP, UDP, TCP/IP, and HTTP can be used. The sensor 100 can be adapted with the list of users (e.g automation systems) allowed to connect to the device. Security protocols can be implemented as required by the users. For facilities or mobile platforms that include ADS-B functionality, a transmitter normally used to report aircraft position can be modified to additionally report the time recorded by the RMT sensor 100.

The processing module 108 provides overall control and processing for the RMT sensor 100. It may be configured for the appropriate radar detector type, adapted for the configured radar types, the number of interrogations expected per scan, the approximate scan rate of the radar, and other parameters well known to one of ordinary skill in the art. The RMT sensor processing module 108 marks the value of real time, as described below, for each detected Azimuth Change or Reference Pulse (ACP or ARP), search radar illumination, or beacon interrogation depending on the embodiment. Subsequent to the burst of illuminations or interrogations, the processing module 108 determines the optimum time measurement that represents the center of the radar beam in a manner well known to one of ordinary skill in the art. The processing module 108 filters unwanted reflections or false interrogations detected by the radar equipment from the airspace environment. The processing module 108, assisted by the radar azimuth detector interface 102 if it includes the radar message decoding scheme shown and described in International Publication No. WO 2005/085898, also takes into account the case when multiple radars of differing scan rates are being serviced or detected, and the interrogations from these radars occur at the same instant at the sensor location.

The system further includes a time alignment processing module 110. In one embodiment, the time alignment processing module 110 includes software that is installed within the automation systems 80 to make use of the RMT sensor reports.

Automation systems can include processing to estimate radar measurement time. For example, the existing STARS uses an adapted radar message for time alignment. The radar Search Real-Time Quality Control (RTQC), Beacon RTQC, or North Sector mark messages can be used as the time alignment message as determined by adaptation. The automation system marks the receipt of the adapted time alignment message to establish the estimated radar measurement time for the azimuth associated with the time alignment message. Once the estimated time for this azimuth is established, the time for other azimuth values is calculated assuming a measured, relatively constant, scan rate. Automation radar data processing software maintains an average of preceding actual scan periods using the interval between receipt of successive RTQC messages. It is this slowly-dynamic value that is utilized in the timestamping of radar target reports as they arrive at the automation system.

Each radar type has different transmission delays from the time of radar target detection to when the target message arrives at the automation processors, when they are time-stamped using the automation system clock. The automation system can include adaptation to adjust for the differences in the various radar types and their transmission delays to align the estimated radar measurement time for multiple radars.

However, rotation rate variation within a single scan and dynamic delay variations due to effects, such as transmission quality and processor loading, remain uncorrected. Particularly for short-range radars that are not protected by a radome, wind loading and other mechanical noise sources perturb the antenna scan rate. Thus, the various azimuth angles occur early or late relative to that predicted by assuming a constant or slowly-varying scan rate. Wind effects are periodic at the nominal scan rate (e.g., five or twelve seconds for a short or long range radar, respectively) with the scan slowing down at some angles and speeding up at others. The resulting scan "waveform" may be sampled only once per revolution (e.g at the North Sector mark) in current automation systems.

Multiple RMT sensors located in different azimuth directions provide additional independent intervening measurements that allow the system to more-closely sample the scan waveform, thereby reducing the overall error between measurements. Multiple radar time sensors also improve the robustness of the system, allowing it to tolerate failures of individual radar time sensors or their associated communication links.

Existing air traffic control automation systems can readily be modified, via minor software enhancements, to interface with multiple RMT sensors. The location of the sensors would be adapted within the automation system, or in the case of moving RMT sensors, determined from position reports for the aircraft or vehicle on which they reside. In either case, the automation system has sufficient information to determine the azimuth of any RMT sensor. The RMT sensors provide the absolute times at which each associated radar azimuth was interrogated or illuminated. Using the dynamically calculated (mostly constant) scan rate, the absolute time at other azimuths can be calculated, thus providing the absolute time of measurement for all radar targets at all azimuth values for that radar.

In another aspect of the invention, RMT sensor information is filtered to enhance performance. Time can be measured once per radar scan, or less frequently (e.g. every 10th scan), if desired. As each new time is applied to subsequent incoming radar reports, if it is different from the preceding measurement (which could be caused by various random or periodic processes mentioned above or by a shift in the scan period), a transient is introduced. This transient could momentarily perturb calculation of target velocity by the automation system tracker, potentially causing false or missed alerts in critical safety algorithms (e.g., Conflict Alert and Minimum Safe Altitude Warning) and disturbances in other functions that depend on the tracker outputs.

In one embodiment, a filter is provided within the time alignment processing module 110 to smooth such transients and diminish their effects. Filtering is also useful when multiple RMT sensors are employed and the transients could be greater due to wind effects as described above. In this case, filtering serves as a mechanism to use the additional measurements to approximate the scan rate waveform discussed above, providing a time correction that varies smoothly with azimuth rather than jumping suddenly with each new time sample.

The design of the filter, depending on the expected errors and required system performance, can range from a first-order infinite impulse response (IIR) digital filter to a Kalman filter that takes individual RMT sensor performance characteristics into account. The filter is preceded by a time window, referenced to each accepted sample using a time derived from the nominal scan rate and adapted RMT sensor locations, to reject spurious time measurements.

When the automation system is receiving both the RMT sensor inputs and the existing time alignment message input, the automation software is able to calculate the delay for the time alignment message for the radar. This time delay represents the difference in time of when the radar was absolutely at the azimuth contained in the time alignment message compared with the time the message actually arrives at the automation system processors. Subsequently, if the RMT sensor input to the automation system fails, the radar delay time can be used until the failure condition is corrected. It is recognized that the delay time method of determining radar measurement time is not as accurate as the RMT time sensor method, but it does provide a degraded mode of operation.

It is understood that no amount of improvement in timestamping accuracy for radar target reports will compensate for their diminished positional accuracy relative to ADS-B or multilateration reports. When the radar reports and ADS-B reports are fused in the Kalman filter, the higher update rate and better accuracy of ADS-B or multilateration reports will dominate the tracking solution. However, the fusing of radar and ADS-B reports allows 'seamless' transition in the tracking as the aircraft moves in and out of the coverage of different sensors.

An advantage of improving the radar target report timestamping arises in mixed equipage environments, where some aircraft are not ADS-B equipped. The RMT sensor helps remove the time delay bias between the directly reported time in ADS-B reports and the computed time for radar reports.

In one embodiment, a radar measurement time sensor user, such as STARS, is required to login and provide a password via a service request message. Once a connection has been established, each RMT sensor provides a message to the user at least once per scan for each radar being monitored. The RMT sensors provide the absolute time when the radar beam last pulsed the sensor. The output message also includes appropriate RMT sensor status information, such as no illumination/interrogation detected, transponder failure, clock failure, etc. The sensor user can also implement a user requested option to reduce the rate of message updates from the sensor. For example, the RMT sensor can be commanded to provide an absolute time of radar measurement once every 10 scans, for example, instead of every scan.

Table 1 below lists exemplary embodiments described below and indicates how elements of FIG. 2 apply to the various embodiments.

TABLE 1

Exemplary RMT Embodiments Summary

| | | | Elements - See FIG. 2. | | | | |
|---|---|---|---|---|---|---|---|
| | Embodiment | FIG. | 102 Radar Azimuth Detector Interface | 106 Universal Time Interface | 108 Processing Module | 104 Communications Interface | 110 Time Alignment Processing |
| RMT Integrated with Radar | 1.1 Legacy Radar | 2A | Use ARP or ACP from radar's Azimuth measurement device | Use GPS or WWVB receiver or IRIG-B, etc. | Create RMT message | Pass RMT via Telecomm. or internet to Automation System | Use multiple RMTs, Filter, Extend to each target report from that Radar. |

TABLE 1-continued

Exemplary RMT Embodiments Summary

Elements - See FIG. 2.

| Embodiment | | FIG. | 102 Radar Azimuth Detector Interface | 106 Universal Time Interface | 108 Processing Module | 104 Communications Interface | 110 Time Alignment Processing |
|---|---|---|---|---|---|---|---|
| | 1.2 New Radar | 2A | Use Azimuth Angle from radar's Azimuth measurement device | | | Incorporate RMT in New Radar to Automation Interface | |
| Remote RMT for Search Radar | 2.1 Stand Alone | 3 | Antenna and Receiver at Search freq.; A/D Converter | Use wireless time source; e.g. GPS or WWVB receiver | Time Stamp Search Beam Center Passage | Telecomm. or internet to Automation System | Same as above |
| | 2.2 Integrate with MTI Reflector | 3 | Use Existing Antenna and Receiver; add A/D Converter | | | | |
| Remote RMT for Beacon Radar. | 3.1 Stand Alone | 4 | Antenna and Receiver at Beacon (SSR) Interrogation frequency; Decoder; A/D Converter | Same as above | Time Stamp Beacon Interrogation Beam Center Passage | Same as above | Same as above |
| | 3.2 Integrate with PARROT | 4 | Use Existing Antenna, Receiver, and Decoder; add A/D Converter | | | | |
| | 3.3 Integrate with Multilateration Sensor | 5 | Use Existing Antenna; Add Receiver, decoder, A/D Converter, and for * Duplexer and Transmitter. | Use Existing GPS time source | Same as above | Incorporate RMT in Interface to Automation System and send to multilateration interrogator | Same as above |
| | 3.4 Integrate with ADS-B Ground Station | 5 | | | | Incorporate RMT in Interface to Automation System | |
| | 3.5 Integrate with ADS-B Airborne Transponder | 6 | Use Existing Antenna, Receiver, SSR Decoder, SSR (or UAT) Transmitter; Add A/D Converter | Same as above | Same as above | Incorporate RMT in Existing Squittters | Associate RMT with radar, use measured azimuth, then same as above. |

Figure 2A:
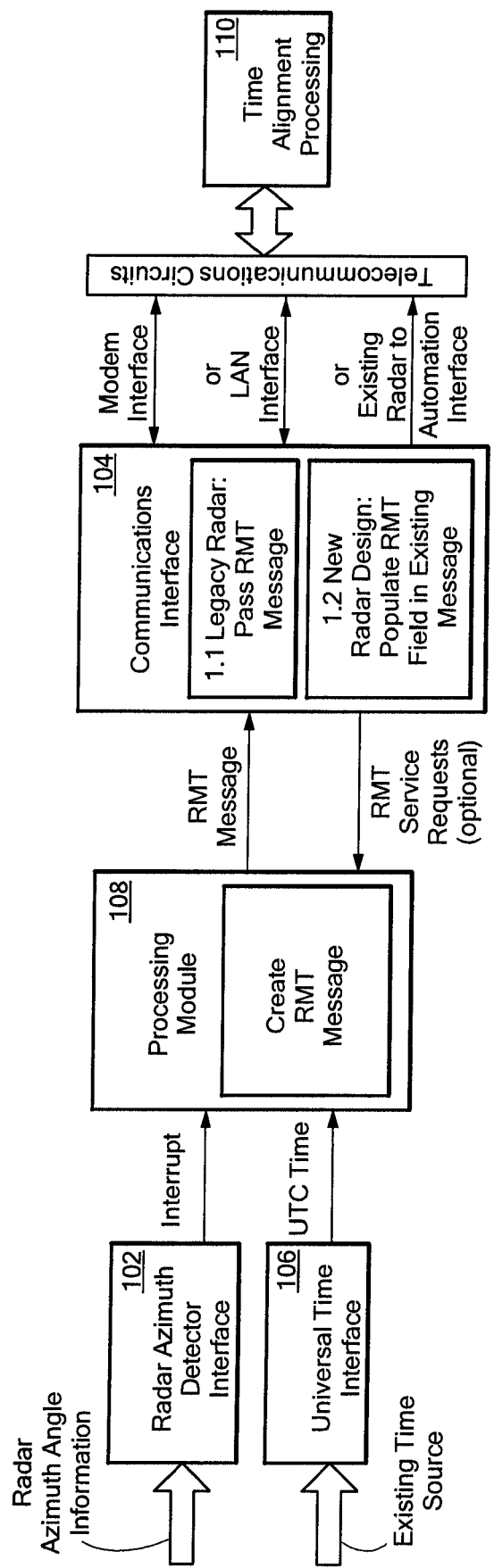
FIG. 2A is a pictorial representation of processing through an RMT sensor in accordance with an exemplary embodiment of the invention in which the RMT is integrated with a radar system.

The following description, summarized in Table 1 above, conveys additional information for the various embodiments. Information already presented above in conjunction with FIG. 1 and FIG. 2 applies, but is not generally repeated below. Note that there are three general classes of embodiments:

RMT Integrated with a Radar System
Remote RMT for Search (PSR) Radar
Remote RMT for Beacon (SSR) Radar RMT Integrated with a Radar System FIG. 2A depicts and illustrates processing flow for embodiments in which the RMT sensor is located with or near the radar system. FIG. 2A includes commonality with the RMT sensor 100 and automation systems 80 of FIG. 2, where like reference elements indicate like system elements.

The RMT sensor includes a radar azimuth detector interface 102 to receive information from existing radars and a communication interface 104 to receive information from and provide information to telecommunication circuits. In this exemplary embodiment, the radar azimuth detector interface 102 receives azimuth angle information, azimuth change pulses (ACPs) and azimuth reference pulses (ARP), for example, from the radar system, and generates periodic interrupts to the processing module 108, which controls the overall operation of the RMT sensor. The universal time interface 106 receives time data from a universal time source, such as IRIG-B, GPS, WWVB, etc. When the azimuth reference pulse (ARP) or azimuth change pulse (ACP) indicates that the antenna is pointing at certain pre-determined angles, the processing module 108 records the current value of absolute time.

The processing module 108 uses the time information to apply a time stamp to each angle change event and sends the resulting radar measurement time (RMT) reports to the communications interface 104. In one embodiment for application with legacy radars (Table 1 entry 1.1), the communications interface 104 formats and sends the RMT messages via a LAN interface, modem interface, etc, over suitable telecommunication circuits, for example, to the time alignment processing function 10 within automation systems. In another embodiment for application with newly-designed or upgraded radar (Table 1 entry 1.2), the communications interface 104, inserts the RMT report information into a field, for example the time of applicability field of radar output messages, ASTERIX for example, that also convey other information about the target report.

Using this approach, a single RMT sensor receiving both ACPs and ARPs can provide the precise time that the radar 60 was oriented at any given angle. Since there is rarely an instantaneous change in radar rotation rate, fewer samples than one per ACP give adequate results. This is a cost-effective approach as it uses the signals generated by the radar and does not require radar detection equipment. However, access to the radar azimuth reference signals must be provided.

Remote RMT for Search (PSR) Radar

Figure 3:
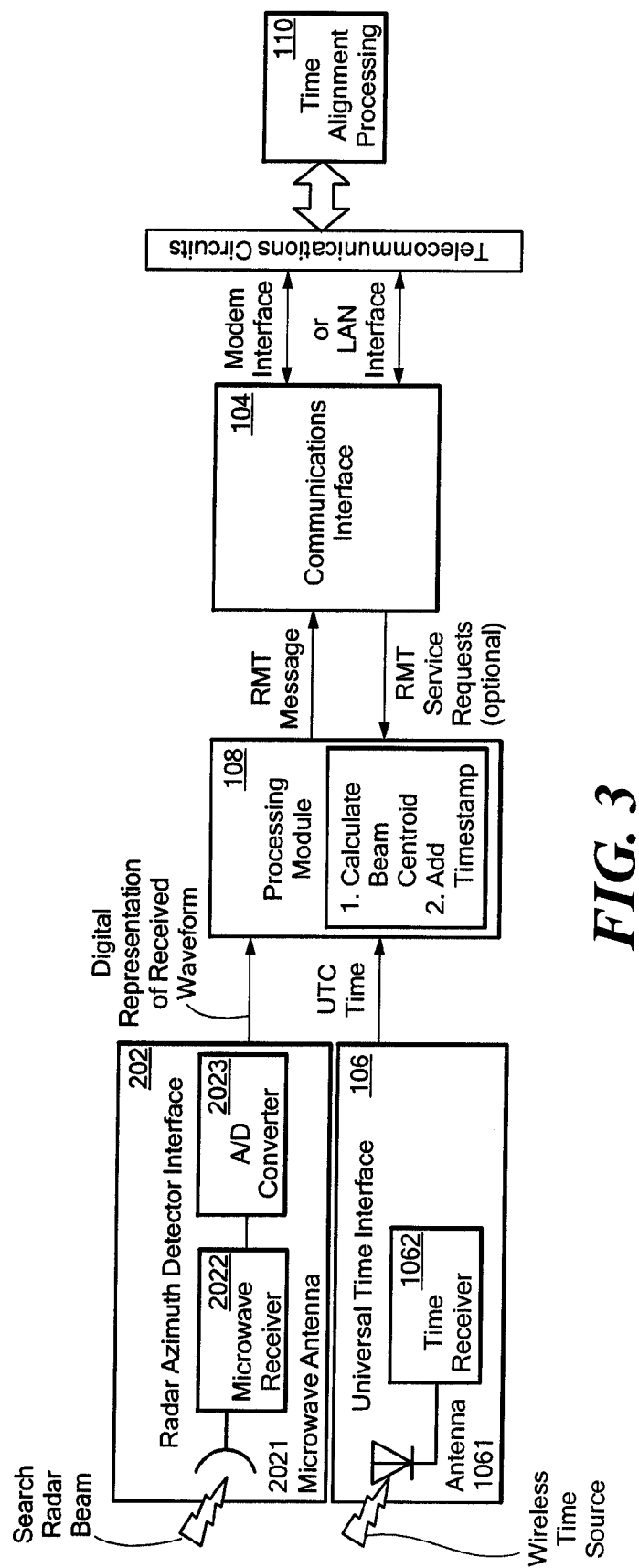
FIG. 3 is a pictorial representation of processing through an RMT sensor in accordance with an exemplary embodiment of the invention in which the RMT is located remotely from the radar and senses its search beam.

FIG. 3 depicts and illustrates processing flow for two exemplary embodiments in which the RMT sensor(s) are located at various pre-determined azimuth angles from the radar system, where they sense passage of the search radar beam. FIG. 3 includes some commonality with the RMT sensor 100 and automation system 80 of FIG. 2, where like reference elements indicate like system elements.

The radar azimuth detector interface 202 provides a digital representation of the received waveform to the processing module 108. The processing module 108 determines the beam centroid timing, then adds UTC time and sends a RMT message to the communications interface 104, as described above.

In an exemplary embodiment, the radar azimuth detector interface 202 includes a microwave antenna 2021, a microwave receiver 2022 tuned to the search radar frequency, and an A/D converter 2023. In one embodiment (Table 1 entry 2.1), these components are implemented stand-alone, i.e., separately from any other NAS system. In another embodiment (Table 1 entry 2.2), the microwave antenna 2021 and microwave receiver 2022 are shared with an existing MTI reflector, currently employed for search radar performance checking.

Remote RMT for Beacon (SSR) Radar

Figure 4:
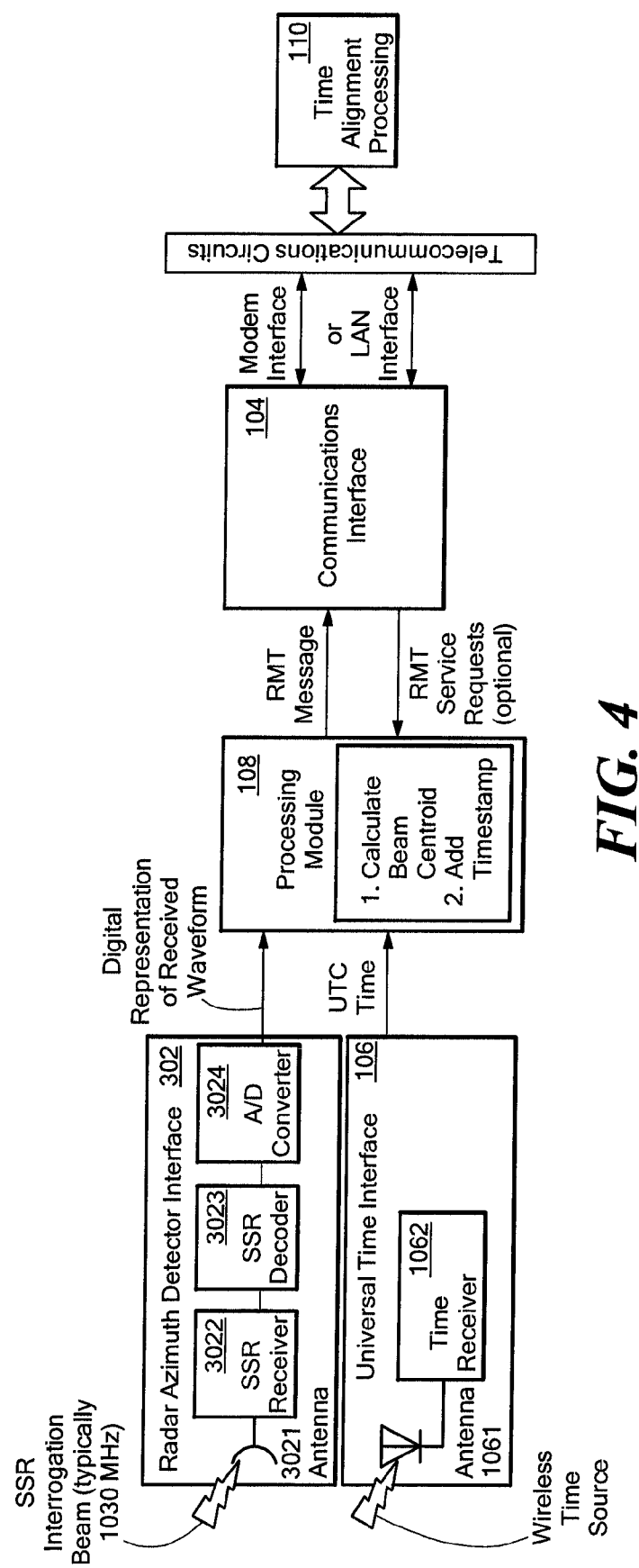
FIG. 4 is a pictorial representation of processing through an RMT sensor in accordance with an exemplary embodiment of the invention in which the RMT is located remotely from the radar and senses its beacon (SSR) beam.

FIG. 4 depicts and illustrates processing flow for two embodiments in which the RMT sensor(s) are located at various pre-determined azimuth angles from the radar system, where they sense passage of the beacon radar beam. FIG. 4 includes commonality with the RMT sensor 100 and automation system 80 of FIG. 2, where like reference elements indicate like system elements.

The radar azimuth detector interface 302 provides a digital representation of the received waveform to the processing module 108. The processing module 108 determines the beam centroid timing, then adds UTC time and sends a RMT message to the communications interface 104, as described above.

In an exemplary embodiment, the radar azimuth detector interface 302 includes a microwave SSR antenna 3021, a microwave SSR receiver 3022 tuned to the beacon radar interrogation frequency (typically 1030 MHz), a SSR decoder 3023 that interprets the interrogation pulse sequences and spacings, and an A/D converter 3024. It will be readily apparent to one of ordinary skill in the art that one or more of these components may be of conventional design as employed in aircraft transponders, for example, or, for improved performance in busy RF environments, as described in WO 2005/085898 Radar Message Decoding Scheme.

In one embodiment (Table 1 entry 3.1), these components are implemented in a stand-alone configuration, i.e., separately from any other NAS system. In another embodiment (Table 1 entry 3.2), the microwave antenna 2021 and microwave receiver 2022 are shared with an existing PARROT, currently employed for beacon radar performance checking.

Figure 5:
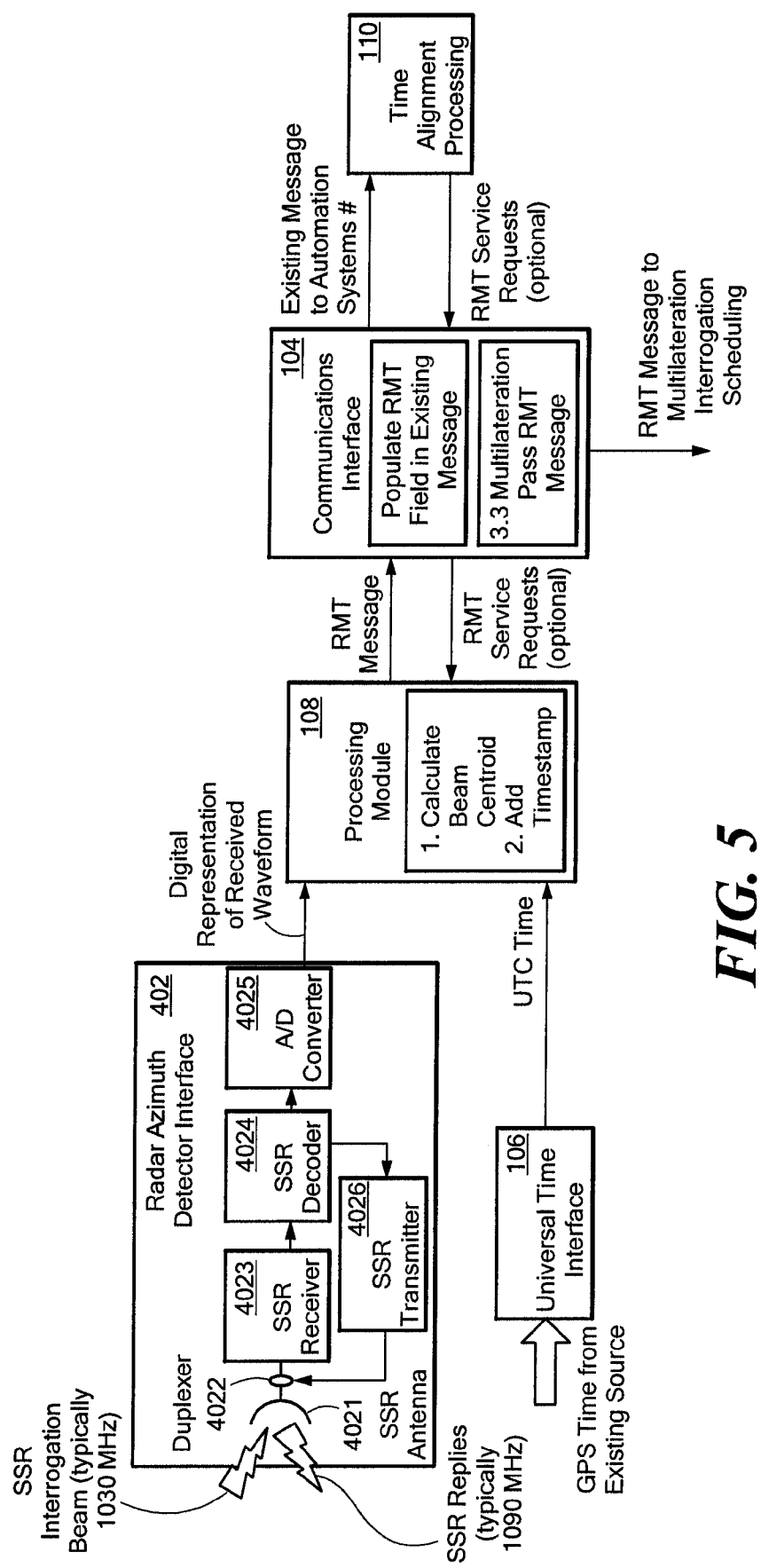
FIG. 5 is a pictorial representation of processing through an RMT sensor in accordance with an exemplary embodiment of the invention in which the RMT is located remotely from the radar, senses its beacon (SSR) beam, and is integrated with a multilateration or ADS-B ground station sensor system.

FIG. 5 depicts and illustrates processing flow for two additional embodiments in which the RMT sensor(s) are located at various pre-determined azimuth angles from the radar system, where they sense passage of the beacon radar beam. FIG. 5 includes commonality with the RMT sensor 100 and automation system 80 of FIG. 2, where like reference elements indicate like system elements.

The radar azimuth detector interface 402 provides a digital representation of the received waveform to the processing module 108. The processing module 108 determines the beam centroid timing, then adds UTC time and sends a RMT message to the communications interface 104, as described above.

In one embodiment, the radar azimuth detector interface 402 includes a microwave SSR antenna 4021, a microwave SSR receiver 4023 tuned to the beacon interrogation radar frequency (typically 1030 MHz), a SSR decoder 4024 that interprets the interrogation pulse sequences and spacings, and an A/D converter 4025. These components may be of conventional design as employed in aircraft transponders, for example, or, for improved performance in busy RF environments, as described in WO 2005/085898 Radar Message Decoding Scheme. Additional components, Duplexer 4022 and SSR Transmitter 4026, can be added such that the equipment also functions as a conventional PARROT, employed for beacon radar performance checking.

In one embodiment (Table 1 entry 3.3), some of the components within the radar azimuth detector interface 402 (the SSR microwave antenna 4021), as well as GPS time source and messages to the time alignment processing 110 within the automation systems are shared with a multilateration remote unit. Some form of blanking, directional antenna, and/or duplexing can be used to avoid interference from the multilateration system 1030 MHz interrogation transmitters. Multilateration interrogation times are known in advance so precise blanking can be readily implemented. A secondary radar interrogates approximately twenty-two times per beam width, with 7 (11) at each mode in 3 (2)-mode interlace, so there is sufficient information for the processing module 108 in the RMT sensor to estimate the time at beam center even after an occasional radar interrogation is blanked while a remote unit interrogates.

In a further extension of embodiment (Table 1 entry 3.3), the timing information available from the 1030 MHz receiver via the radar azimuth detector interface 402, processing module 108, and communications interface 104 is used to schedule multilateration remote unit interrogations to avoid conflicts both in the radar azimuth detector interface and in other transponders near the same azimuth as the radar beam sweeps by.

In another embodiment (Table 1 entry 3.4), the same components as for Table 1 entry 3.3 (within the radar azimuth detector interface 402, the SSR microwave antenna 4021, as well as GPS time source and messages to the time alignment processing 110 within the automation systems) are shared with an ADS-B ground station.

Figure 6:
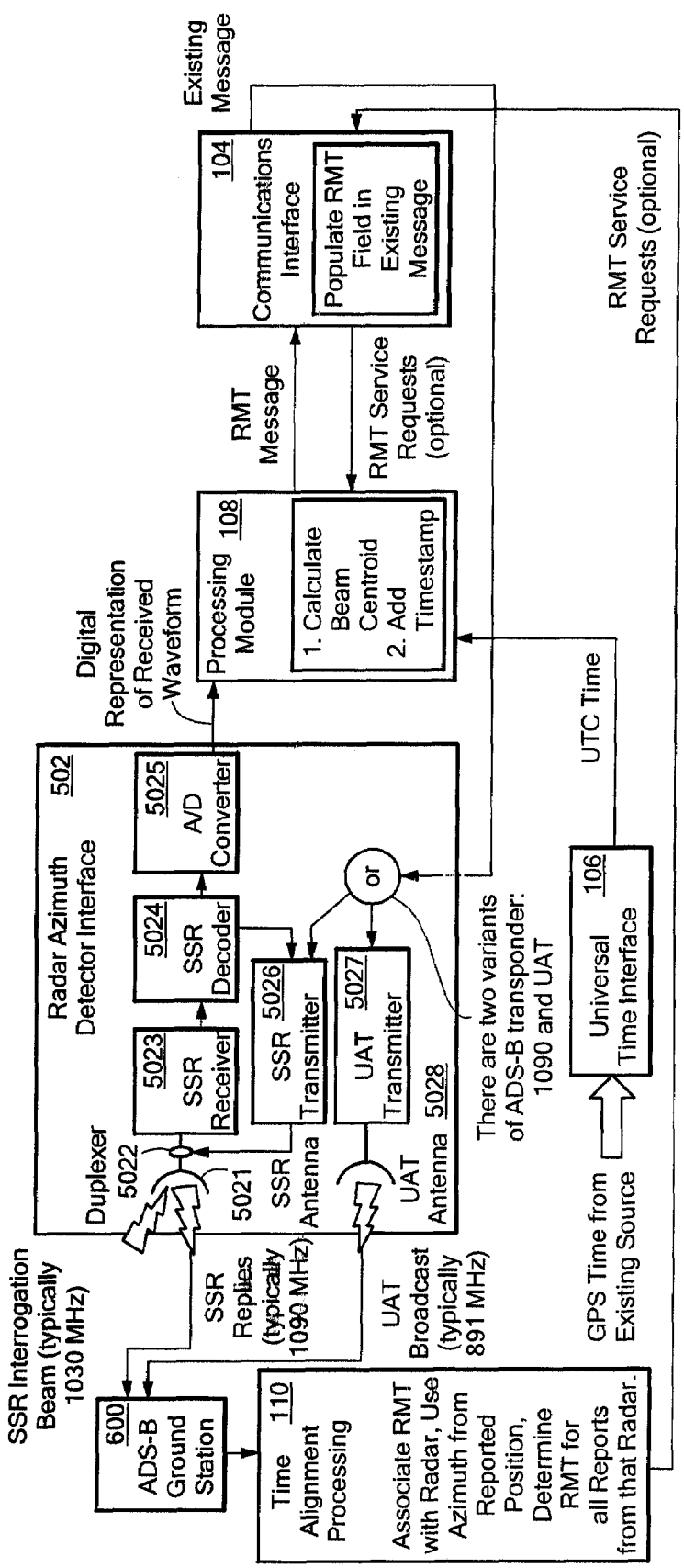
FIG. 6 is a pictorial representation of processing through the RMT sensor in accordance with an exemplary embodiment of the invention in which the RMT is located remotely from the radar in aircraft, senses its beacon (SSR) beam, and is integrated with an airborne ADS-B transponder.

FIG. 6 depicts and illustrates processing flow for another embodiment in which the RMT sensor(s) sense passage of the beacon radar beam, but are located at various dynamically-changing azimuth angles from the radar system. FIG. 6 includes commonality with the RMT sensor 100 and automation systems 80 of FIG. 2, where like reference elements indicate like system elements.

In a further embodiment (Table 1 entry 3.5) a RMT sensor is integrated with ADS-B airborne transponders. An ADS-B transponder that may be airborne can host one or more RMT sensors, which may be moving, but with precisely-known positions.

A system having an RMT sensor integrated with airborne ADS-B transponders includes transponders that apply a GPS time stamp at the time-center of the secondary radar's interrogation beam received by the 1030 MHz receiver. The resulting "radar beam" time stamp can be:

sent immediately, along with a corresponding GPS position, to each ground station in a unique message, and/or placed in a field added to the outgoing ADS-B squitters so the same information would be conveyed via the next outgoing ADS-B message along with 'normal' output.

By placing the time stamp in a field, less bandwidth is required than the former approach, particularly given that there may be multiple radars seen by the transponder. The resulting 0-1 second delay, some of which is needed to allow the entire beam to sweep by, can readily be corrected out. The following description of this embodiment adopts the latter approach, which is also more compatible with plans for future ADS-B implementations.

Referring to FIG. 6, the radar azimuth detector interface 502 provides a digital representation of the received waveform to the processing module 108. The processing module 108 determines the beam centroid timing, then adds UTC time and sends a RMT message to the communications interface 104, as described above.

In an exemplary embodiment, the radar azimuth detector interface 502 includes a microwave SSR antenna 5021, a Duplexer 5022, a microwave SSR receiver 5023 tuned to the beacon interrogation radar frequency (typically 1030 MHz), a SSR decoder 5024 that interprets the interrogation pulse sequences and spacings, and an A/D converter 5025. One or more of these components may be of conventional design as employed in aircraft transponders, for example, or, for improved performance in busy RF environments, they can include components described in WO 2005/085898 Radar Message Decoding Scheme.

It is understood that RMT sensors may be moving in this embodiment. Thus, algorithms in the time alignment processing 110 within the automation system, for example, should account for such movement. Rather than using the adapted position of the RMT sensors, the instantaneous position received via the ADS-B report is used. The time alignment processing 110 also needs to associate received beams with particular radars because there can be more than one interrogating the transponder. The automation system has information, including radar target reports for the aircraft hosting the RMT sensors, to enable such association.

It is understood that this embodiment can work with both variants of ADS-B transponders, one employing a 1090 MHz SSR transmitter 5026, while the other employs the UAT transmitter 5027 and UAT antenna 5028 for communicating with an ADS-B ground station 600.

This scheme could readily be combined with other embodiments, providing measurements of opportunity from passing ADS-B equipped aircraft, as well as from fixed ADS-B ground stations. A variant of this embodiment (Table 1 entry 3.5) could readily be applied in a fixed ground location with a directional antenna dedicated to one particular SSR radar system, simplifying the time alignment processing 110 and avoiding potential association issues with multiple SSR radar systems.

It is understood that a variety of modifications and substitutions will be readily apparent to one of ordinary skill in the art that do not depart from the invention. Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method, comprising:
   (a) detecting energy transmission from a radar system;
   (b) determining an azimuth angle of the energy transmission;
   (c) receiving universal time information;
   (d) tagging the determined azimuth angle of the detected energy transmission with the universal time information to provide a report; and
   (e) transmitting the report to an automation system.

2. The method according to claim 1, wherein the energy transmission includes an azimuth change pulse and an azimuth reference pulse.

3. The method according to claim 1, wherein the universal time information is provided by a global positioning system (GPS).

4. The method according to claim 1, further including determining absolute time for a range of azimuth locations for the radar system from the azimuth angle of the energy transmission and the universal time information based upon an azimuth scan rate.

5. The method according to claim 1, wherein the automation system includes an en route and terminal automation system.

6. The method according to claim 1, wherein the detected energy transmission includes search radar illumination.

7. The method according to claim 1, wherein the detected energy transmission includes beacon interrogation.

8. The method according to claim 1, further including determining a radar beam center for the detected radar energy for tagging with the universal time information.

9. The method according to claim 1, using the report to improve aircraft position measurement accuracy for reducing aircraft separation intervals.

10. The method according to claim 1, wherein the steps (a)-(e) are performed by a multilateration system having a plurality of remote units.

11. The method according to claim 1, wherein the steps (a)-(e) are performed by an automatic dependent surveillance-broadcast (ADS-B) system.

12. A radar measurement time sensor, comprising:
   a radar detector interface to receive energy from a radar system;
   a time interface to receive universal time information for association with the received radar energy information;
   a processing module to associate the universal time information with the radar energy information and generate a report; and
   a telecommunication interface to transmit the report to a remote system.

13. The sensor according to claim 12, wherein the received radar energy includes an azimuth control pulse and an azimuth reference pulse.

14. The sensor according to claim 12, wherein the universal time information is provided by a GPS.

15. The sensor according to claim 12, wherein the remote system includes an automation system that improves aircraft position measurement accuracy facilitating reduced aircraft separation intervals based upon the report.

16. A system, comprising:
a radar system;
a plurality of radar measurement time sensors to receive energy from the radar system at different azimuth angles from which azimuth information can be determined and to receive universal time information, the radar measurement time sensor including a processing module to provide periodic reports containing azimuth and universal time information; and
one or more automation systems to receive the reports.

17. The system according to claim 16, wherein the received energy includes an azimuth control pulse and an azimuth reference pulse.

18. The system according to claim 16, wherein each automation system improves aircraft position measurement accuracy, facilitating reduced aircraft separation intervals based upon information in the report.

19. A method, comprising:
measuring a time of applicability for at least one air traffic control radar measurement of aircraft position without modification to an air traffic control radar system, by:
receiving air traffic control radar system interrogation waveforms at a plurality of remote physical locations at different azimuth angles relative to a radar;
receiving universal time information and determining the universal time information associated with the radar measurement;
providing time/azimuth information in messages to one or more existing automation systems that are also receiving reports from the radar system; and
using the time/azimuth information to determine the time of applicability for each radar report received by each automation system.

20. The method according to claim 19, wherein the remote physical locations include stationary and moving locations.

21. A method for use in monitoring one or more air traffic control radars, comprising:
receiving air traffic control radar system interrogation waveform at a plurality of remote stationary physical locations at different azimuth angles relative to the radar system;
measuring characteristics of the received waveform including beam shape, sidelobe levels, and received power;
determining universal time information associated with the radar measurement;
providing the measured characteristics and universal time information in messages to one or more existing systems that also receive reports from the radar; and
using this information to monitor radar performance.

22. A method, comprising:
using one or more multilateration or ADS-B ground stations each with a radar measurement time (RMT) sensor and a communication link to one or more automation systems for monitoring performance of one or more air traffic control radars;
receiving an air traffic control radar system interrogation waveform at a plurality of remote physical locations at different azimuth angles relative to the radar system;
transmitting a reply with a programmable delay to simulate range displacement; and
using the link to the automation system to provide remote monitor and control of the PARROT function;
monitoring radar performance using the received information.

23. The method according to claim 22, wherein the remote monitor and control includes power control and delay setting.

24. The method according to claim 1, wherein the steps (a)-(e) are performed by Moving Target Indicators.

25. The method according to claim 1, wherein the steps (a)-(e) are performed by PARROTs (Position-Adjustable-Range-Reference-Orientation-Transponders).

26. The method according to claim 1, wherein the steps (a)-(e) are performed by transponders within aircraft.

27. The system according to claim 16, wherein the radar measurement time sensors are integrated with the ground stations of a multilateration aircraft position sensor system.

28. The system according to claim 16, wherein the radar measurement time sensors are integrated with the ground stations of an ADS-B aircraft position sensor system.

29. The system according to claim 16, wherein the radar measurement time sensors are integrated with one or more MTI reflectors.

30. The system according to claim 16, wherein the radar measurement time sensors are integrated with one or more PARROTs (Position-Adjustable-Range-Reference-Orientation-Transponders).

31. The system according to claim 16, wherein the measurement time sensors are integrated with one or more Transponders in aircraft.

\* \* \* \* \*

UNITED STATES PATENT AND TRADEMARK OFFICE
CERTIFICATE OF CORRECTION

PATENT NO. : 7,616,149 B2 Page 1 of 1
APPLICATION NO. : 11/536198
DATED : November 10, 2009
INVENTOR(S) : Powers et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 87 days.

Signed and Sealed this

Fourteenth Day of December, 2010

David J. Kappos
*Director of the United States Patent and Trademark Office*